United States Patent
Kurian et al.

(10) Patent No.: US 10,621,363 B2
(45) Date of Patent: Apr. 14, 2020

(54) LAYERING SYSTEM FOR RESOURCE DISTRIBUTION DOCUMENT AUTHENTICATION

(71) Applicant: BANK OF AMERICA CORPORATION, Charlotte, NC (US)

(72) Inventors: Manu Jacob Kurian, Dallas, TX (US); Joseph Benjamin Castinado, North Glenn, CO (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 235 days.

(21) Appl. No.: 15/621,597

(22) Filed: Jun. 13, 2017

(65) Prior Publication Data

US 2018/0357423 A1 Dec. 13, 2018

(51) Int. Cl.
  *G06F 21/60* (2013.01)
  *H04L 9/32* (2006.01)
  *G06Q 20/04* (2012.01)
  *G06Q 20/08* (2012.01)
  (Continued)

(52) U.S. Cl.
  CPC .......... *G06F 21/60* (2013.01); *G06F 21/6218* (2013.01); *G06Q 20/042* (2013.01); *G06Q 20/08* (2013.01); *H04L 9/3255* (2013.01); *G06F 2221/2111* (2013.01);
  (Continued)

(58) Field of Classification Search
  CPC ....... G06F 21/60; G06F 21/2618; H04L 9/32; H04L 9/3255; H04L 63/107; G06Q 20/042; G06Q 20/08; G07B 17/00733
  See application file for complete search history.

(56) References Cited

U.S. PATENT DOCUMENTS

| 5,412,190 A | 5/1995 | Josephson et al. |
| 6,189,785 B1 | 2/2001 | Lowery |
| 6,243,689 B1 | 6/2001 | Norton |

(Continued)

OTHER PUBLICATIONS

International Search Report and Written Opinion for International Patent Application No. PCT/US12/27892 dated Jun. 25, 2012.

(Continued)

*Primary Examiner* — Ali S Abyaneh
*Assistant Examiner* — Alexander R Lapian
(74) *Attorney, Agent, or Firm* — Michael A. Springs; Moore & Van Allen PLLC; Nicholas C. Russell

(57) ABSTRACT

Embodiments of the invention are directed to systems, methods, and computer program products for layering authorization of resource distribution documents within an entity. In this way, the invention generates a multi-step layering process for resource distribution document generation. As such, each individual involved in resource distribution document generation process may add a unique layer to the resource distribution document prior to being authorized for use. Once the several layers have all been applied to the resource distribution document, the document becomes authenticated and approved for use. In some embodiments, the layers may include physical layers on the resource distribution document, such as account numbers, signature lines or the like. In some embodiments, the layers may include digital layers that combine to create a digital or physical marking on the resource distribution document identifying authentication for depositing.

18 Claims, 7 Drawing Sheets

(51) Int. Cl.
*G06F 21/62* (2013.01)
*G07B 17/00* (2006.01)
(52) U.S. Cl.
CPC .............. *G06F 2221/2113* (2013.01); *G06F 2221/2141* (2013.01); *G07B 17/00733* (2013.01); *H04L 9/32* (2013.01)

(56) References Cited

U.S. PATENT DOCUMENTS

| | | |
|---|---|---|
| 6,554,185 B1 | 4/2003 | Montross et al. |
| 6,912,660 B1* | 6/2005 | Petrogiannis .......... G06F 21/64 |
| | | 713/165 |
| 6,996,263 B2 | 2/2006 | Jones et al. |
| 7,016,532 B2 | 3/2006 | Boncyk et al. |
| 7,090,122 B1 | 8/2006 | Warren et al. |
| 7,137,551 B1 | 11/2006 | Crews et al. |
| 7,155,228 B2 | 12/2006 | Rappaport et al. |
| 7,207,478 B1 | 4/2007 | Blackson et al. |
| 7,389,913 B2 | 6/2008 | Starrs |
| 7,403,652 B2 | 7/2008 | Boncyk et al. |
| 7,412,081 B2 | 8/2008 | Doi |
| 7,424,303 B2 | 9/2008 | Al-Sarawi |
| 7,477,780 B2 | 1/2009 | Boncyk et al. |
| 7,526,280 B2 | 4/2009 | Jung et al. |
| 7,564,469 B2 | 7/2009 | Cohen |
| 7,565,008 B2 | 7/2009 | Boncyk et al. |
| 7,680,324 B2 | 3/2010 | Boncyk et al. |
| 7,702,588 B2 | 4/2010 | Gilder et al. |
| 7,775,437 B2 | 8/2010 | Cohen |
| 7,792,738 B2 | 9/2010 | Channell |
| 7,814,336 B1 | 10/2010 | Nisbet et al. |
| 7,840,456 B2 | 11/2010 | Patzer |
| 7,881,529 B2 | 2/2011 | Boncyk et al. |
| 7,899,243 B2 | 3/2011 | Boncyk et al. |
| 7,899,252 B2 | 3/2011 | Boncyk et al. |
| 7,912,785 B1 | 3/2011 | Kay |
| 8,045,784 B2 | 10/2011 | Price et al. |
| 8,104,674 B2 | 1/2012 | Smith et al. |
| 8,138,930 B1 | 3/2012 | Heath |
| 8,195,570 B1 | 6/2012 | Barron et al. |
| 8,255,278 B1 | 8/2012 | Young et al. |
| 8,290,237 B1 | 10/2012 | Burks et al. |
| 8,332,329 B1 | 12/2012 | Thiele |
| 8,385,950 B1 | 2/2013 | Wagner et al. |
| 8,401,904 B1 | 3/2013 | Simakov et al. |
| 8,438,110 B2 | 5/2013 | Calman et al. |
| 8,474,704 B1 | 7/2013 | Grimm et al. |
| 8,583,492 B2 | 11/2013 | Connell |
| 8,626,662 B2 | 1/2014 | Pinski |
| 8,639,621 B1 | 1/2014 | Ellis et al. |
| 8,714,336 B2 | 5/2014 | Csulits et al. |
| 8,911,507 B1* | 12/2014 | Gilbert .................. H04L 63/107 |
| | | 726/35 |
| 9,002,749 B1 | 4/2015 | Thiele |
| 9,025,851 B2 | 5/2015 | Smith et al. |
| 9,031,308 B2 | 5/2015 | Sandoz et al. |
| 9,171,296 B1 | 10/2015 | Kurian |
| 9,355,391 B2 | 5/2016 | von Behren et al. |
| 2001/0034739 A1* | 10/2001 | Anecki .................. G06Q 10/10 |
| | | 715/205 |
| 2002/0013728 A1 | 1/2002 | Wilkman |
| 2002/0026423 A1 | 2/2002 | Maritzen et al. |
| 2002/0042773 A1 | 4/2002 | Fugitte et al. |
| 2002/0073025 A1 | 6/2002 | Tanner et al. |
| 2002/0152179 A1 | 10/2002 | Racov |
| 2003/0064705 A1 | 4/2003 | Desiderio |
| 2004/0021584 A1 | 2/2004 | Hartz, Jr. et al. |
| 2004/0024709 A1 | 2/2004 | Yu et al. |
| 2004/0111370 A1 | 6/2004 | Saylors et al. |
| 2006/0049242 A1 | 3/2006 | Mejias et al. |
| 2006/0074799 A1 | 4/2006 | Averyt et al. |
| 2006/0074803 A1 | 4/2006 | Crowell et al. |
| 2006/0100951 A1 | 5/2006 | Mylet et al. |
| 2006/0144923 A1 | 7/2006 | VanKirk et al. |
| 2007/0063017 A1* | 3/2007 | Chen ...................... G06Q 20/02 |
| | | 235/379 |
| 2007/0094095 A1 | 4/2007 | Kilby |
| 2007/0140595 A1 | 6/2007 | Taylor et al. |
| 2007/0175977 A1 | 8/2007 | Bauer et al. |
| 2007/0278290 A1 | 12/2007 | Messerges et al. |
| 2008/0021803 A1 | 1/2008 | Ahles et al. |
| 2008/0040278 A1 | 2/2008 | DeWitt |
| 2008/0109324 A1 | 5/2008 | Rosmarin et al. |
| 2008/0147561 A1 | 6/2008 | Euchner et al. |
| 2008/0214210 A1 | 9/2008 | Rasanen et al. |
| 2008/0245854 A1 | 10/2008 | Monden |
| 2008/0268876 A1 | 10/2008 | Gelfand et al. |
| 2008/0274028 A1* | 11/2008 | Lin ........................ C01F 17/00 |
| | | 423/263 |
| 2008/0307307 A1 | 12/2008 | Ciudad et al. |
| 2009/0005010 A1 | 1/2009 | Dote et al. |
| 2009/0094125 A1 | 4/2009 | Killian et al. |
| 2009/0102859 A1 | 4/2009 | Athsani et al. |
| 2009/0140839 A1 | 6/2009 | Bishop et al. |
| 2009/0144164 A1 | 6/2009 | Wane et al. |
| 2009/0171850 A1 | 7/2009 | Yuval |
| 2009/0182748 A1 | 7/2009 | Walker |
| 2009/0185241 A1 | 7/2009 | Nepomniachtchi |
| 2009/0192903 A1 | 7/2009 | Weiss et al. |
| 2009/0204511 A1 | 8/2009 | Tsang |
| 2009/0250515 A1 | 10/2009 | Todd et al. |
| 2009/0254447 A1 | 10/2009 | Blades |
| 2009/0327133 A1 | 12/2009 | Aharoni et al. |
| 2010/0078471 A1 | 4/2010 | Lin et al. |
| 2010/0122216 A1 | 5/2010 | Song et al. |
| 2010/0125510 A1 | 5/2010 | Smith et al. |
| 2010/0185529 A1 | 7/2010 | Chesnut et al. |
| 2010/0228624 A1 | 9/2010 | Morris et al. |
| 2010/0250581 A1 | 9/2010 | Chau |
| 2010/0316204 A1 | 12/2010 | Loeb et al. |
| 2011/0022540 A1 | 1/2011 | Stern et al. |
| 2011/0034176 A1 | 2/2011 | Lord et al. |
| 2011/0091092 A1 | 4/2011 | Nepomniachtchi et al. |
| 2011/0106845 A1 | 5/2011 | Lipson et al. |
| 2011/0119155 A1 | 5/2011 | Hammad et al. |
| 2011/0202466 A1 | 8/2011 | Carter |
| 2011/0280450 A1 | 11/2011 | Nepomniachtchi et al. |
| 2011/0320325 A1 | 12/2011 | Preston et al. |
| 2012/0158584 A1 | 6/2012 | Behren et al. |
| 2012/0166333 A1 | 6/2012 | von Behren et al. |
| 2012/0179609 A1 | 7/2012 | Agarwal et al. |
| 2012/0203632 A1 | 8/2012 | Blum et al. |
| 2012/0229624 A1 | 9/2012 | Calman et al. |
| 2012/0229625 A1 | 9/2012 | Calman et al. |
| 2012/0229647 A1 | 9/2012 | Calman et al. |
| 2012/0229657 A1 | 9/2012 | Calman et al. |
| 2012/0230538 A1 | 9/2012 | Calman et al. |
| 2012/0230539 A1 | 9/2012 | Calman et al. |
| 2012/0230540 A1 | 9/2012 | Calman et al. |
| 2012/0230548 A1 | 9/2012 | Calman et al. |
| 2012/0230557 A1 | 9/2012 | Calman et al. |
| 2012/0230577 A1 | 9/2012 | Calman et al. |
| 2012/0231424 A1 | 9/2012 | Calman et al. |
| 2012/0231425 A1 | 9/2012 | Calman et al. |
| 2012/0231814 A1 | 9/2012 | Calman et al. |
| 2012/0231840 A1 | 9/2012 | Calman et al. |
| 2012/0232937 A1 | 9/2012 | Calman et al. |
| 2012/0232954 A1 | 9/2012 | Calman et al. |
| 2012/0232966 A1 | 9/2012 | Calman et al. |
| 2012/0232968 A1 | 9/2012 | Calman et al. |
| 2012/0232976 A1 | 9/2012 | Calman et al. |
| 2012/0232977 A1 | 9/2012 | Calman et al. |
| 2012/0232993 A1 | 9/2012 | Calman et al. |
| 2012/0233003 A1 | 9/2012 | Calman et al. |
| 2012/0233005 A1 | 9/2012 | White |
| 2012/0233015 A1 | 9/2012 | Calman et al. |
| 2012/0233025 A1 | 9/2012 | Calman et al. |
| 2012/0233032 A1 | 9/2012 | Calman et al. |
| 2012/0233033 A1 | 9/2012 | Calman et al. |
| 2012/0233070 A1 | 9/2012 | Calman et al. |
| 2012/0233072 A1 | 9/2012 | Calman et al. |
| 2012/0233089 A1 | 9/2012 | Calman et al. |
| 2013/0033522 A1 | 2/2013 | Calman et al. |

(56) References Cited

U.S. PATENT DOCUMENTS

| | | |
|---|---|---|
| 2013/0036050 A1 | 2/2013 | Giordano et al. |
| 2013/0132219 A1 | 5/2013 | Liberty |
| 2013/0155474 A1 | 6/2013 | Roach et al. |
| 2013/0191227 A1 | 7/2013 | Pasa et al. |
| 2013/0218721 A1 | 8/2013 | Borhan et al. |
| 2013/0246199 A1 | 9/2013 | Carlson |
| 2013/0246260 A1 | 9/2013 | Barten et al. |
| 2013/0246261 A1 | 9/2013 | Purves et al. |
| 2013/0254115 A1 | 9/2013 | Pasa et al. |
| 2013/0256403 A1 | 10/2013 | MacKinnon |
| 2013/0317928 A1 | 11/2013 | Laracey |
| 2013/0325667 A1 | 12/2013 | Satyavolu et al. |
| 2013/0325681 A1 | 12/2013 | Somashekar et al. |
| 2014/0279503 A1* | 9/2014 | Bertanzetti ........ G06Q 20/3221 705/44 |
| 2016/0026999 A1 | 1/2016 | Kurian |
| 2018/0241569 A1* | 8/2018 | Harmon ................ H04L 9/3247 |

OTHER PUBLICATIONS

International Search Report and Written Opinion for International Patent Application No. PCT/US12/27890 dated Feb. 5, 2013.
International Search Report and Written Opinion for International Patent Application No. PCT/US12/28036 dated Jun. 4, 2012.
International Search Report and Written Opinion for International Patent Application No. PCT/US12/28008 dated Jun. 4, 2012.
International Search Report and Written Opinion for International Patent Application No. PCT/US2012/027912 dated Jun. 28, 2012.
International Search Report and Written Opinion for International Patent Application No. PCT/US12/48697 dated Oct. 12, 2012.
International Preliminary Report on Patentability for International Patent Application No. PCT/US2012/48697 dated Feb. 4, 2014.
International Preliminary Report on Patentability for International Patent Application No. PCT/US2012/027892 dated Sep. 10, 2013.
International Preliminary Report on Patentability for International Patent Application No. PCT/US2012/027890 dated Sep. 10, 2013.
International Preliminary Report on Patentability for International Patent Application No. PCT/US2012/028036 dated Sep. 10, 2013.
International Preliminary Report on Patentability for International Patent Application No. PCT/US2012/028008 dated Sep. 10, 2013.
International Preliminary Report on Patentability for International Patent Application No. PCT/US2012/027912 dated Sep. 10, 2013.

* cited by examiner

LAYERING SYSTEM FOR RESOURCE DISTRIBUTION DOCUMENT AUTHENTICATION

BACKGROUND

With advancements in technology, user resource access and distribution without authorization is becoming easier. As such, manipulation of resource access, deposits, and distribution is possible.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

In some embodiments, the system generates a multi-step layering process for resource distribution document generation. As such, each individual involved in resource distribution document generation process may add a unique layer to the resource distribution document prior to being authorized for use. Once the several layers have all been applied to the resource distribution document, the document becomes authenticated and approved for use.

For example, in a business environment one or more resource distribution documents may require to be cleared through various individuals within the business, such as a financial officer, accounting department, a manager, or the like prior to be sent to the end user for depositing. The system allows each step in the process to add a layer to the resource distribution document which will make the resource distribution document only valid after all of the layers have been applied. If one or more layers are not there or the layers are not authenticated, the resource distribution document will not be valid for depositing.

In some embodiments, the layers may include physical layers on the resource distribution document, such as account numbers, signature lines or the like. In some embodiments, the layers may include digital layers that combine to create a digital or physical marking on the resource distribution document identifying authentication for depositing.

Furthermore, the system may utilized layer authentication to ensure that each individual layer was approved by the appropriate individual. As such, there may be geo-location for the individual approving the layer to confirm the authentication of the layer generated for the resource distribution document.

Paper resource distribution documents have limited amount of multi-factor authentication or security associated with the distribution of the paper resource distribution documents. Thus, a need exists for advanced security and authentication of the resource distribution document within a business setting.

Embodiments of the invention relate to systems, methods, and computer program products for layering authentication of a resource distribution document, the invention comprising: assigning one or more users a layer for generation of a resource distribution document; integrating a user device for each of the one or more users for layer authorization and application via the user device; communicating a request for generation of a resource distribution document to a first of the one or more users; applying, upon user layer authorization, two or more layers to the resource distribution document, wherein each of the two or more layers are specific to one of the one or more users; confirming the two or more layers applied to the resource distribution document are a complete set of two or more layers required for the resource distribution document to be generated; generating the resource distribution document comprising a coded indication that the complete set of two or more layers have been authorized by the one or more users; and distributing the resource distribution document to an end user for depositing.

In some embodiments, the invention further comprises receiving a request for depositing the resource distribution document from the end user via a receiving institution; confirming the complete set of two or more layers on the resource distribution document based on the coded indication that the complete set of two or more layers have been authorized by the one or more users; and communicating authorization of deposition of the resource distribution document to the receiving institution.

In some embodiments, the invention further comprises: receiving a request for depositing the resource distribution document from the end user via a receiving institution; identifying a lack of the complete set of two or more layers on the resource distribution document based on the coded indication that the complete set of two or more layers have been authorized by the one or more users; and communicating denial of deposition of the resource distribution document to the receiving institution.

In some embodiments, the invention further comprises: receiving a request from an entity for layering authentication of resource distribution document generation; identifying the one or more users required for resource distribution document authentication within the entity and assign each of the one or more users a user specific layer for generation of a resource distribution document; identifying a geo-location of a user device associated with each of the one or more users required for resource distribution document authentication within the entity; and integrating layering authentication abilities onto the user device associated with each of the one or more users for authorizing and applying the user specific layer from the user device.

In some embodiments, the layer is a digital coding onto a resource distribution document that upon the complete set of two or more layers being coded on the resource distribution document activates the resource distribution document depositing.

In some embodiments, each layer of the complete set of two or more layers being coded on the resource distribution document comprises a physical attribute required for the resource distribution document to be valid, wherein the physical attributes include account numbers, amounts, and signature lines.

In some embodiments, each type of resource distribution document requires a specific set of two or more layers from one or more different users within an entity. In some embodiments, the user is one or more individuals with a user device at an entity responsible for an approval of resource distribution document distribution from the entity.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
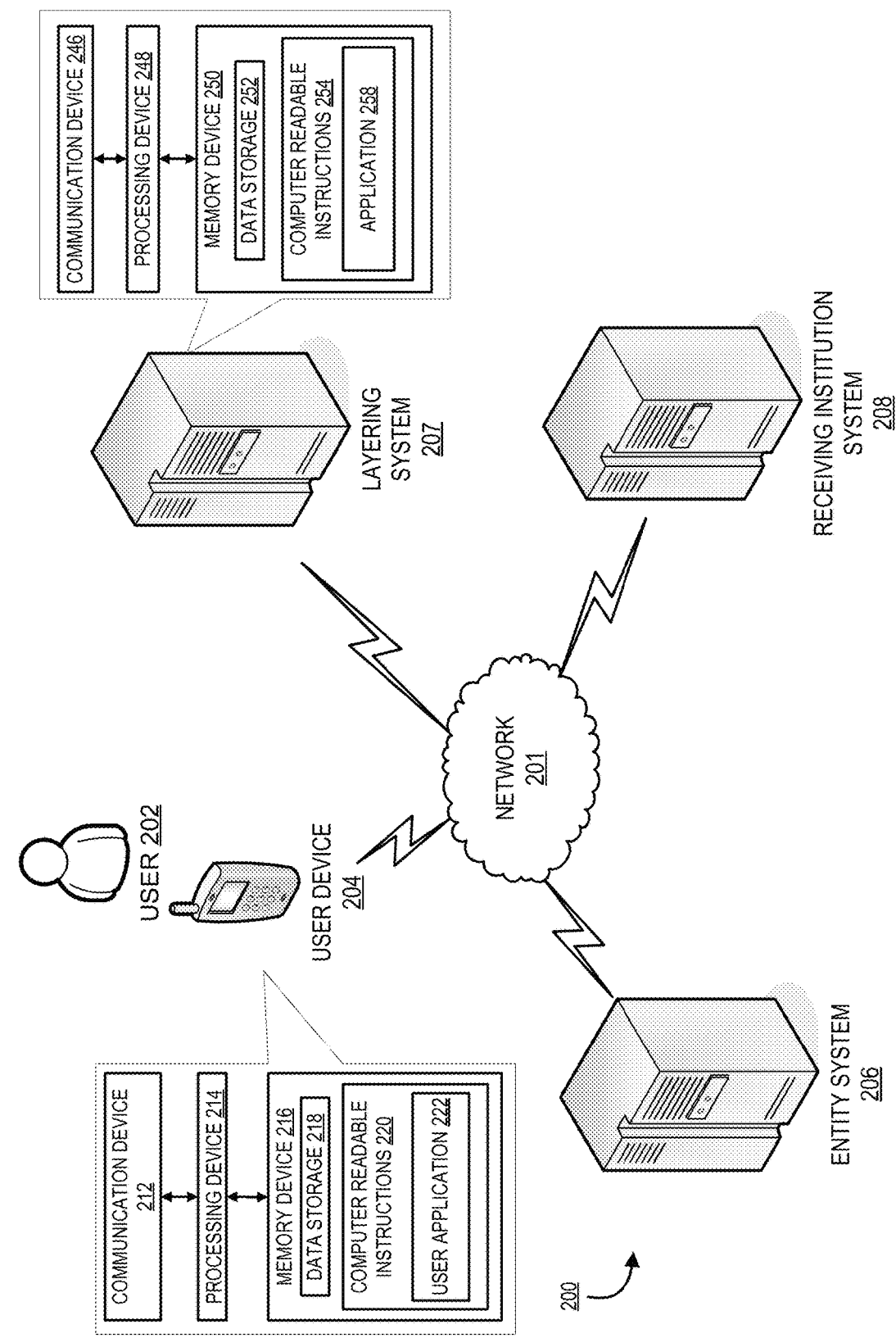
Figure 2:
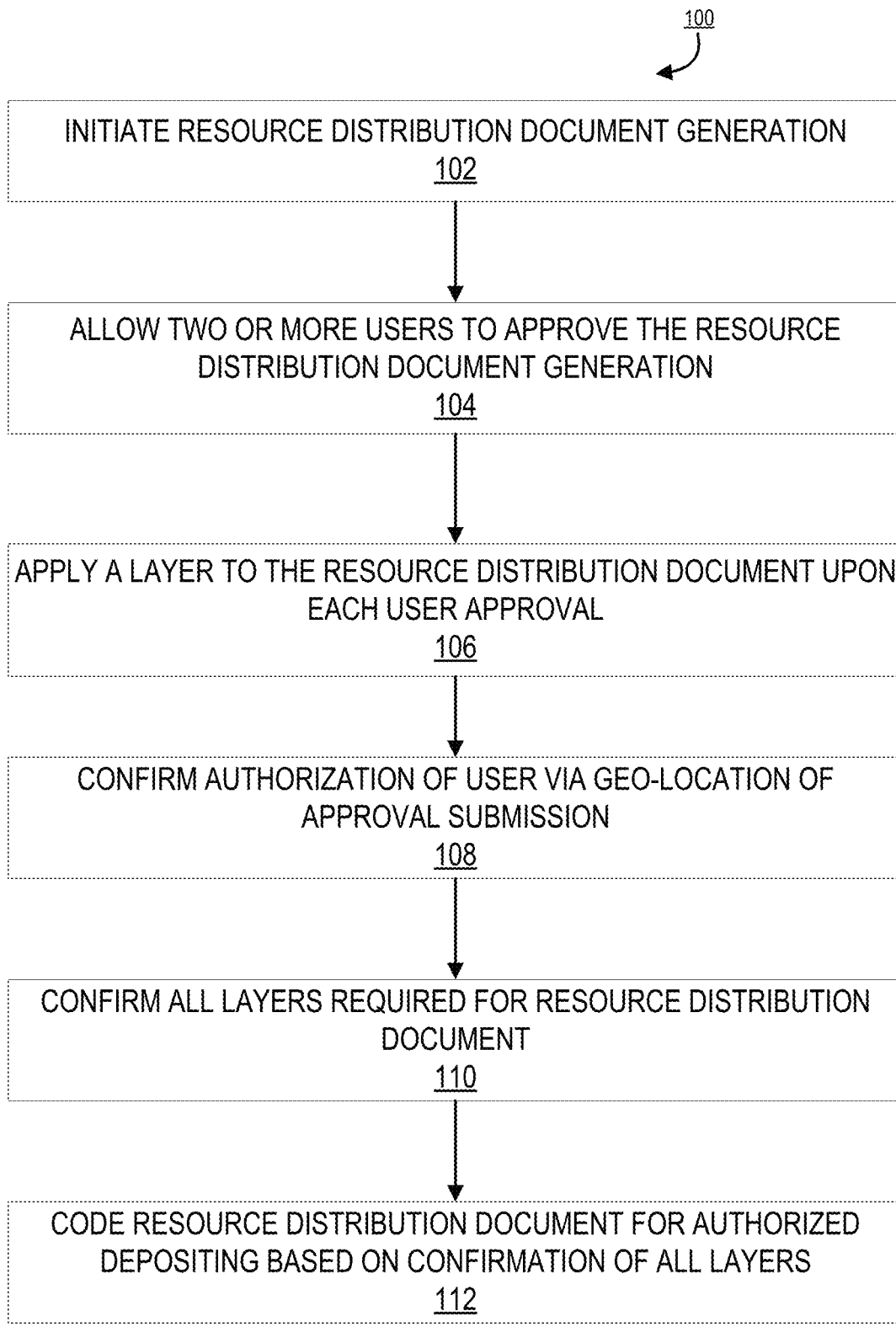
Figure 3:
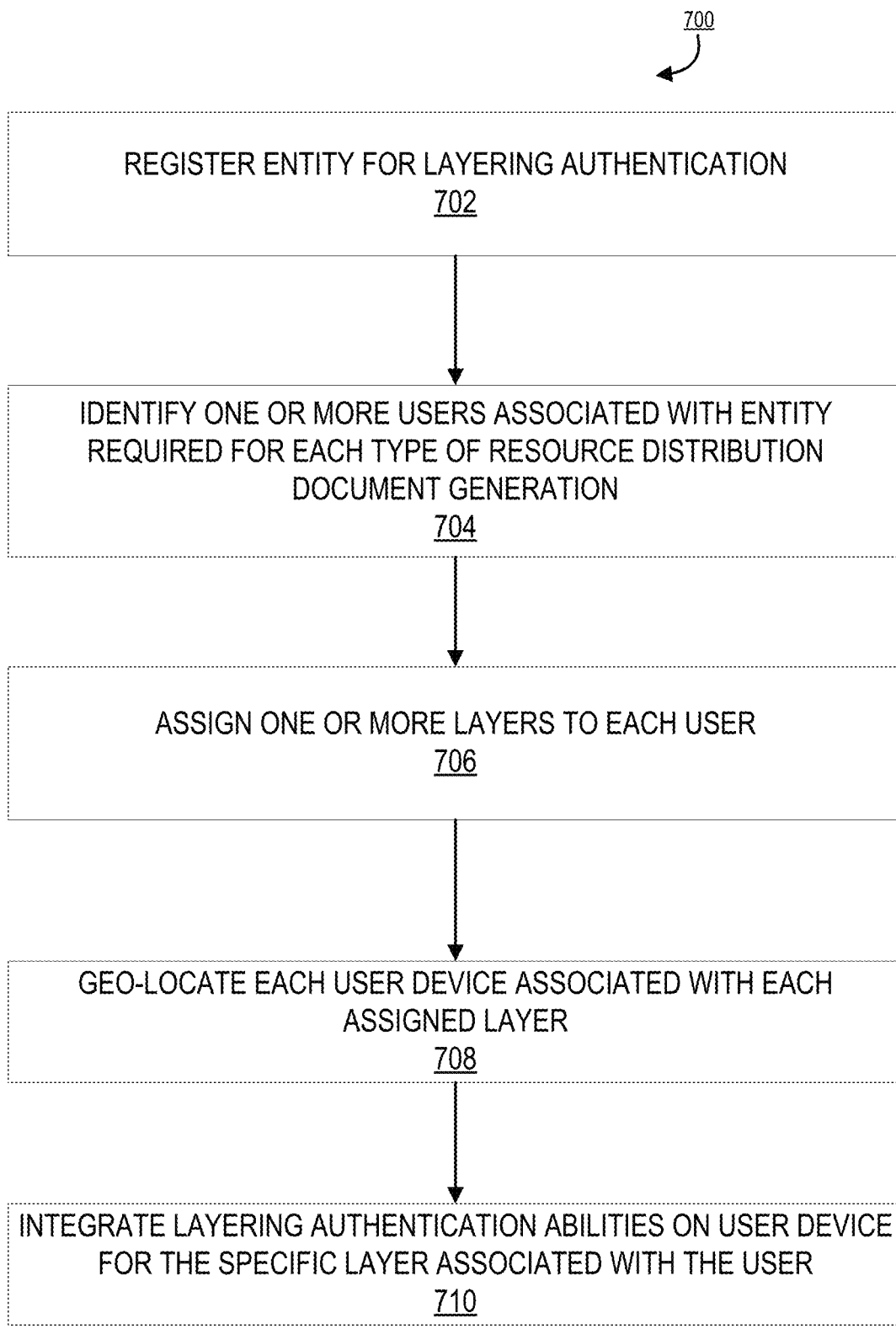
Figure 4:
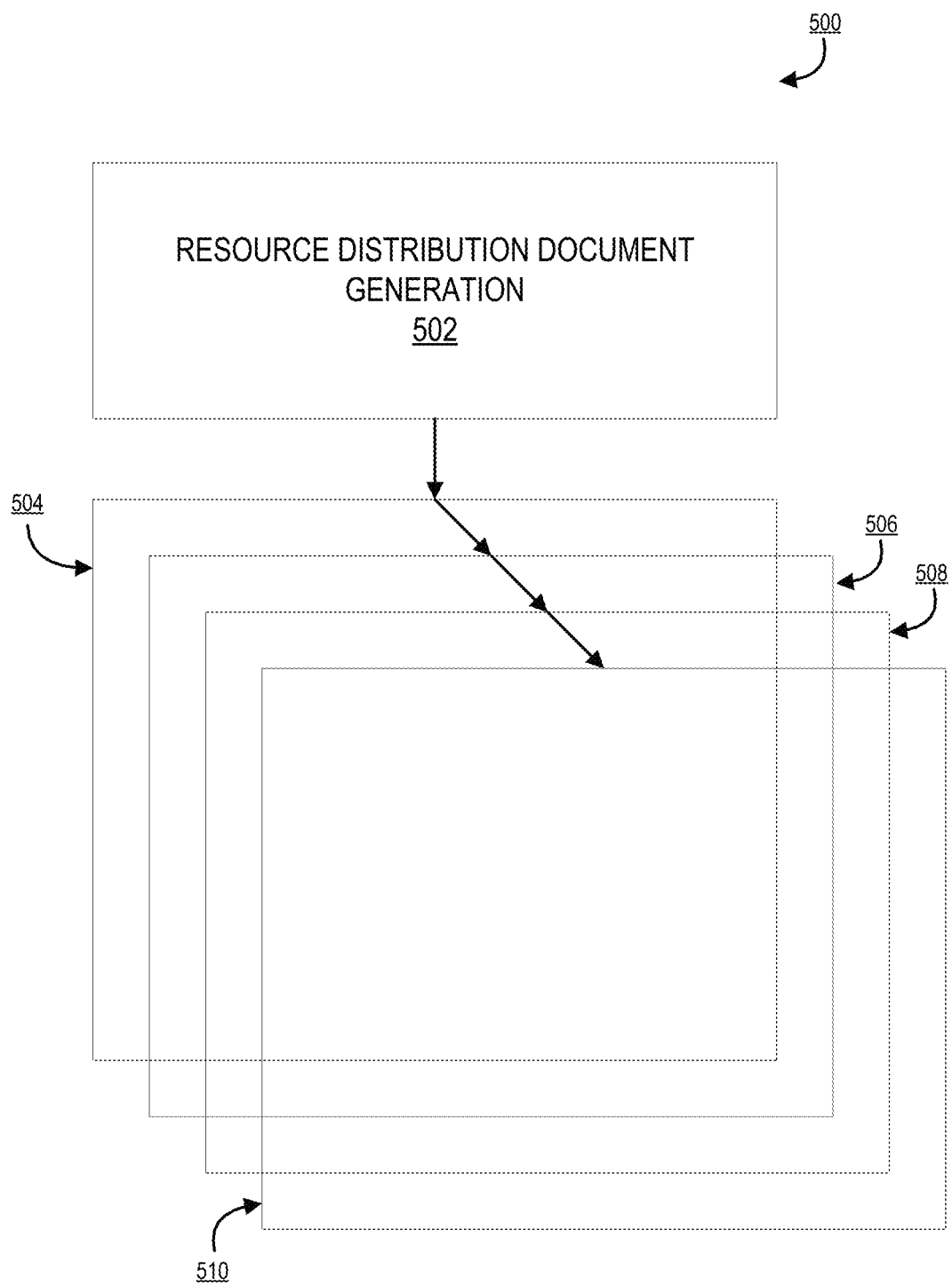
Figure 5:
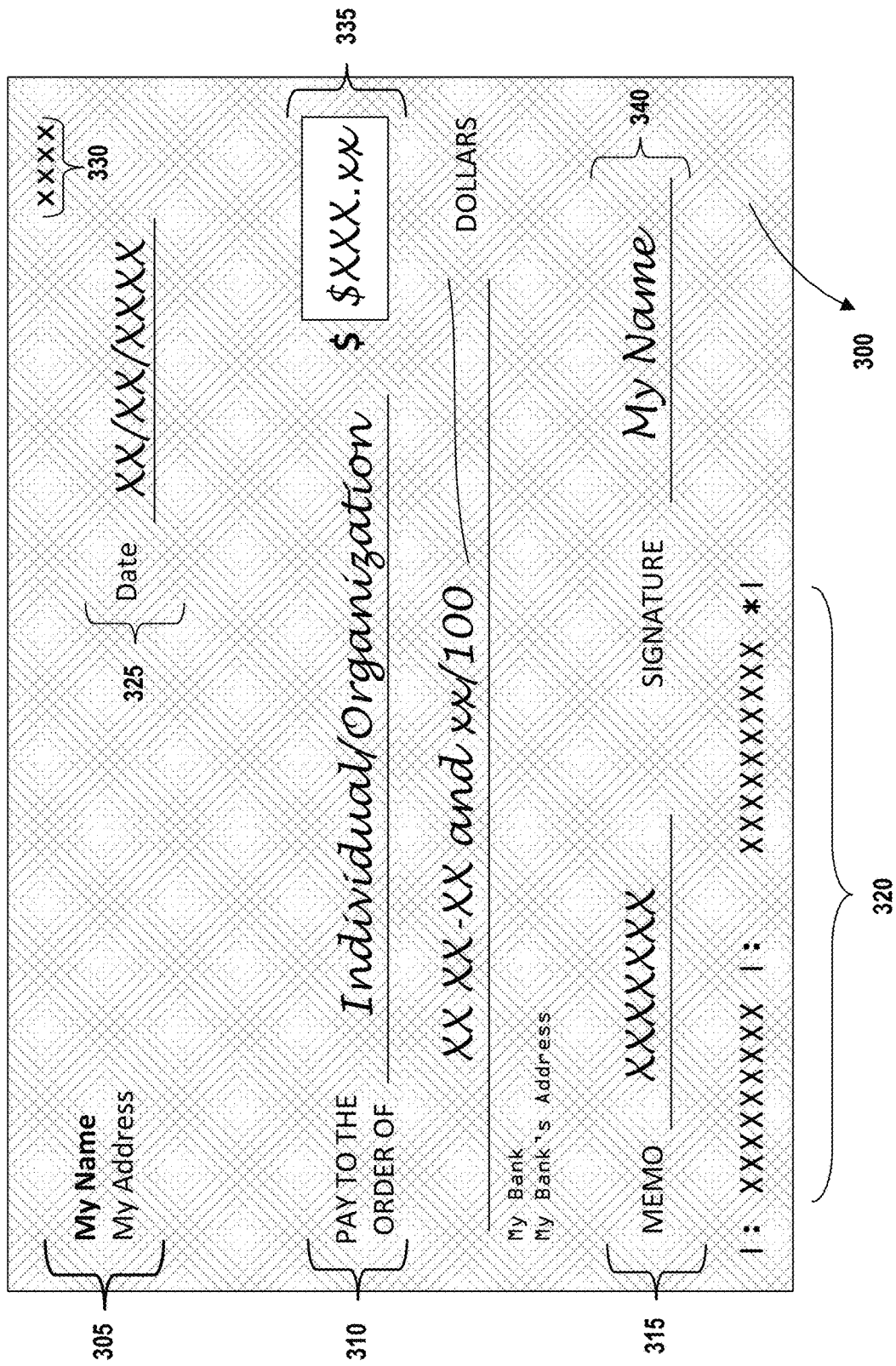
Figure 6:
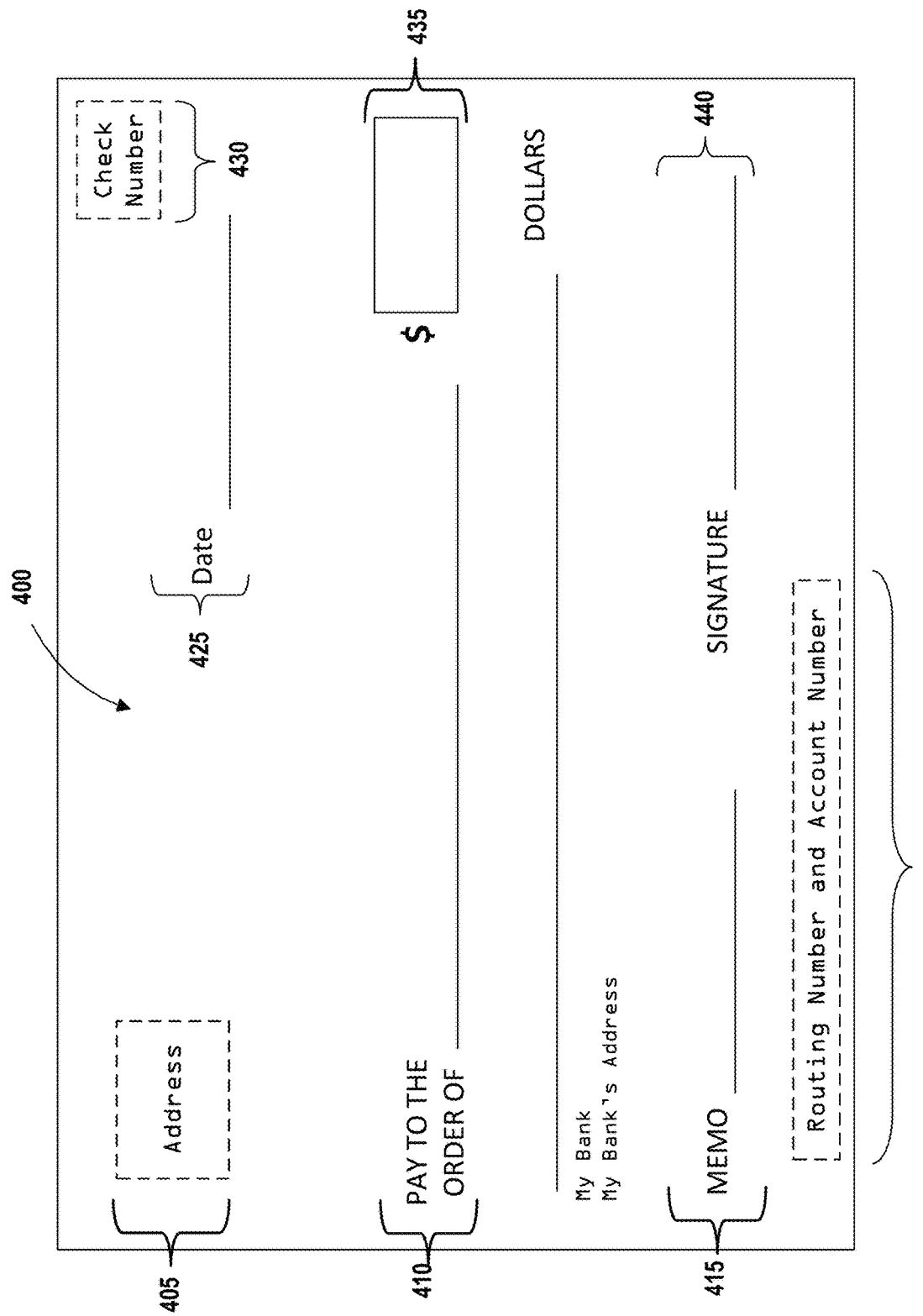
Figure 7:
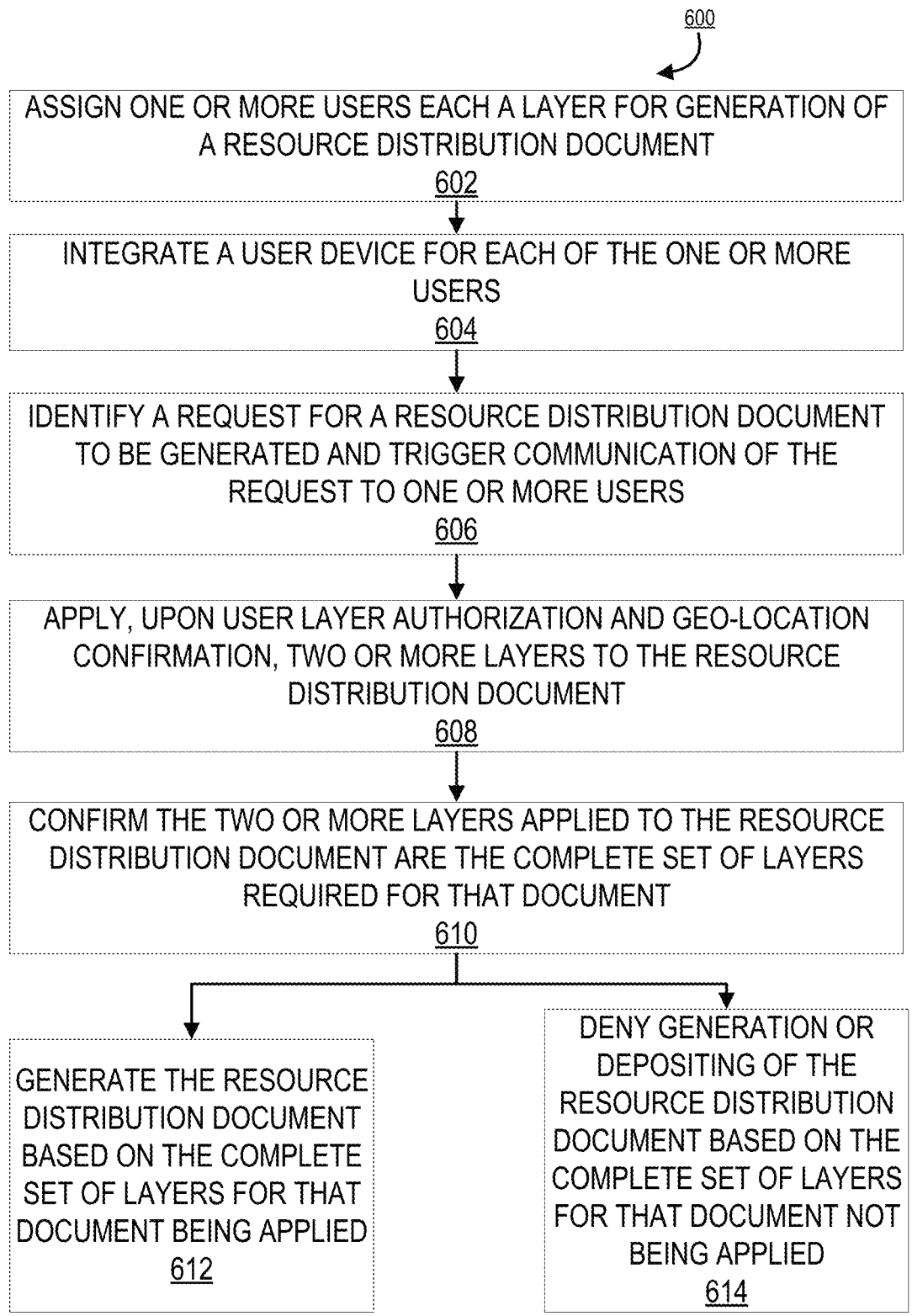

Having thus described embodiments of the invention in general terms, reference will now be made to the accompanying drawings, where:

FIG. 1 illustrates a layering authentication system environment, in accordance with embodiments of the present invention;

FIG. 2 is a flowchart illustrating a high level layering for resource distribution document authentication, in accordance with embodiments of the present invention;

FIG. 3 is a flowchart illustrating generation and activation of the layering authentication, in accordance with embodiments of the present invention;

FIG. 4 is a flowchart illustrating layering a resource distribution document, in accordance with embodiments of the present invention;

FIG. 5 illustrates a representation of one embodiment of a resource distribution document, in accordance with embodiments of the present invention;

FIG. 6 illustrates a representation of one embodiment of a resource distribution document, in accordance with embodiments of the present invention; and FIG. 7 illustrates a process for layering a resource distribution document, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "transaction" or "resource distribution" refers to any communication between a user and the financial institution or other entity monitoring the user's activities to transfer funds for the purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. In some embodiments, a "marker code" as used herein may refer to one or more marks, signals, data points, or the like that may indicate a misappropriation.

In some embodiments, a "resource distribution document" as used herein may refer to any paper or digital document that may transfer or exchange resources, such as funds, across individuals or entities. Resource distribution documents may include checks, certified checks, automated clearing house, contract, or the like.

In some embodiments, an "entity" may be a financial institution or third party merchant. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user configuration that includes only personal information associated with the user, or the like. The account is associated with and/or maintained by the entity. In other embodiments, an entity may not be a financial institution. In still other embodiments, the entity may be the merchant itself.

In some embodiments, the system generates a multi-step layering process for resource distribution document generation. As such, each individual involved in resource distribution document generation process may add a unique layer to the resource distribution document prior to being authorized for use. Once the several layers have all been applied to the resource distribution document, the document becomes authenticated and approved for use.

For example, in a business environment one or more resource distribution documents may require to be cleared through various individuals within the business, such as a financial officer, accounting department, a manager, or the like prior to be sent to the end user for depositing. The system allows each step in the process to add a layer to the resource distribution document which will make the resource distribution document only valid after all of the layers have been applied. If one or more layers are not there or the layers are not authenticated, the resource distribution document will not be valid for depositing.

In some embodiments, the layers may include physical layers on the resource distribution document, such as account numbers, signature lines or the like. In some embodiments, the layers may include digital layers that combine to create a digital or physical marking on the resource distribution document identifying authentication for depositing.

Furthermore, the system may utilized layer authentication to ensure that each individual layer was approved by the appropriate individual. As such, there may be geo-location for the individual approving the layer to confirm the authentication of the layer generated for the resource distribution document.

FIG. 1 illustrates a layering authentication system environment 200, in accordance with embodiments of the present invention. FIG. 1 provides the system environment 200 for which the distributive network system with specialized data feeds associated with resource distribution. FIG. 1 provides a unique system that includes specialized servers and system communicably linked across a distributive network of nodes required to perform the functions of resource distribution document layering for authentication.

As illustrated in FIG. 1, the receiving institution system 208 is operatively coupled, via a network 201 to the user device 204, layering system 207, and to the entity system 206. In this way, the receiving institution system 208 can send information to and receive information from the user device 204, layering system 207, and the entity system 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is one or more individuals required for approving, authorizing, or clearing a resource distribution document for and end user. The user 202 may be associated with an entity, such as within an accounting department, a manager, an officer, or the like individual that may be required to approve or authorize resource distribution to a third party. FIG. 1 also illustrates a user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the entity system 206, the receiving institution system 208, and the layering system 207. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to set up marker codes and communicate with the entity system 206.

As further illustrated in FIG. 1, the layering system 207 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the receiving institution system 208, the entity system 206, and the user device 204. As such, the communication device 246 generally comprises a modem, server, or other device for communicating with other devices on the network 201.

As further illustrated in FIG. 1, the layering system 207 comprises computer-readable instructions 254 stored in the memory device 250, which in one embodiment includes the computer-readable instructions 254 of an application 258. In some embodiments, the memory device 250 includes data storage 252 for storing data related to the system environment 200, but not limited to data created and/or used by the application 258.

In one embodiment of the layering system 207 the memory device 250 stores an application 258. Furthermore, the layering system 207, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more receiving institution system 208, layering system 207, and/or user device 204.

As illustrated in FIG. 1, the entity system 206 is connected to the receiving institution system 208, user device 204, and layering system 207. The entity system 206 has the same or similar components as described above with respect to the user device 204 and the layering system 207.

As illustrated in FIG. 1, the receiving institution system 208 is connected to the layering system 207, user device 204, and entity system 206. In other embodiments, the receiving institution system 208 may be a third party system separate from the entity system 206. The receiving institution system 208 has the same or similar components as described above with respect to the user device 204 and the entity system 206. While only one receiving institution system 208 is illustrated in FIG. 1, it is understood that multiple receiving institution system 208 may make up the system environment 200.

It is understood that the servers, systems, and devices described herein illustrate one embodiment of the invention. It is further understood that one or more of the servers, systems, and devices can be combined in other embodiments and still function in the same or similar way as the embodiments described herein. The receiving institution system 208 may generally include a processing device communicably coupled to devices as a memory device, output devices, input devices, a network interface, a power source, one or more chips, and the like. The receiving institution system 208 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the receiving institution system 208 described herein.

FIG. 2 illustrates a high level flowchart for layering for resource distribution document authentication 100, in accordance with embodiments of the present invention. As illustrated in block 102, the process 100 is initiated by initiating resource distribution document generation. In this way, a user, entity, end user, or the like may determine that a resource distribution document may need to be generated. The resource distribution document may be generated for one or more purposes including, but not limited to, payroll, vendor payments, other payments, or the like.

Once the resource distribution document has been initiated, the process 100 continues by allowing two or more users to approve the resource distribution document generation, as illustrated in block 104. The integration of one or more users and the user devices onto the layering authentication system is further illustrated in FIG. 3.

Once each of the one or more users receives the request for approval for the resource distribution document, the user must approve the resource distribution document for distribution. As illustrated in block 106, a layer may be applied to the resource distribution document upon each user's approval. In this way, using the user device the user may approve the resource distribution document. The layering system may integrate into the user device to allow the user access to the resource distribution document and to approve the resource distribution document for distribution. Upon user approval, the layering system may add the user specific layer to the resource distribution document.

As illustrated in block 108, the process 100 continues by confirming authorization of user via geo-location of approval submission by the user. In this way, the layering system may identify the location of the user device associated with the approval and confirm the authorization of the user based on that geo-location. As illustrated in block 110, the layering system confirms all layers that are required for the resource distribution document have been applied.

Finally, based on a confirmation of the layers being applied to the resource distribution document, the system may code the resource distribution document for authorized depositing based on the confirmation of all layers, as illustrated in block 112. In some embodiments, the coding may comprise a digital marking or digital coding that may be read and confirmed by an institution receiving the resource distribution document for depositing. In some embodiments, the coding may be a marking or indicator printed onto the resource distribution document during generation. In other embodiments, the layers of the resource distribution document may be the specific elements of the resource distribution document and as such, may not be deposited if one or more of the elements is missing.

FIG. 3 is a flowchart illustrating generation and activation of the layering authentication 700, in accordance with embodiments of the present invention. As illustrated in block 702, the process 700 is initiated by an entity registering for layering authentication. In this way, an entity that provides resource distribution documents such as checks or the like to employees, third parties, vendors, contractors, or the like may request and resister for the layering authentication. Furthermore, the entity may require one or more users to approve the resource distribution document drafting prior to disseminating the resource distribution document.

Once an entity has registered, the layering system may identify one or more users associated with the entity that require approval for each time of resource distribution document generated, as illustrated in block 704. In this way, the layering system may identify one or more users that will be required to approve a resource distribution document being generated. In other embodiments, the entity may provide the layering system with one or more users that need to approval one or more resource distribution documents generated. In some embodiments, the users selected may be different based on the type of resource distribution document being generated.

Once the one or more users are identified, the layering system may assign one or more layers to each user, as illustrated in block 706. In this way, the layering system may assign a layer to the user for generation of the resource distribution document. In some embodiments, the layers may be a digital layer readable by a receiving institution. In some embodiments, the layers may be a physical or marker on the resource distribution document. In other embodiments, the layers may be one or more required parts of the resource distribution document, such as account numbers or the like.

As illustrated in block 708, the process 700 continues by geo-locating each user device associated with each user assigned to the layers. As such, the layering system may identify a location of the user device associated with each user in order to authenticate the user approval of the resource distribution document. The layering system may identify a geo-location of a user device via an IP address, network location, user identification, GPS, or the like. In some embodiments, the user device may be mobile and as such the layering system may identify a location of the user device as being a common location of the user device and not deviated from a normal routine of the user device.

Next, as illustrated in block 710, the process 700 is completed by integrating the layering authentication abilities onto the user device for the specific layer associated with the user. In this way, the system may integrate authorization coding and requirement coding into the user device for communication with the layering system for authentication of the resource distribution document layer associated with the user.

FIG. 4 illustrates layering a resource distribution document 500, in accordance with embodiments of the present invention. As illustrated in block 502, the process 500 is initiating by triggering the generation of a resource distribution document at an entity. In this way, the entity determines a resource distribution document may be generated for distribution to an end user such as a third party entity, employee, customer, distributor, or the like.

At this point, the layering system may identify the users within the entity that are required to approve the resource distribution document. These users may include officers, accountants, managers, or the like. Once the triggering of a resource distribution document generation has been initiated by the entity, the layering system may communicate a request to a first user, via a first user device, of one or more users that are required to authorize a layer for the resource distribution document.

The layer system may communicate the resource distribution document generation to the first user for review and approval. The first user may log into his/her user device and approve the resource distribution document generation. The layering system may receive this approval and confirm the user device geo-location to ensure no misappropriation. The layering system may apply the first user's layer to the resource distribution document, as illustrated in block 504. In some embodiments, the layer may be a digital coding on the resource distribution document. In some embodiments, the layer may be a physical printed mark or notification on the resource distribution document. In some embodiments, the layer may be a physically printed necessary part of the resource distribution document. In yet other embodiments, each layer may be a particular color printed ink that combine to generate a final resource distribution document ready for distribution and depositing.

Upon the first user authorization and application of the layer, the layer system may communicate to a second user for review and approval of the resource distribution document. The second user may log into his/her user device and approve the resource distribution document generation. The layering system may receive this approval and confirm the user device geo-location to ensure no misappropriation. The layering system may apply the second user's layer to the resource distribution document, as illustrated in block 506. In some embodiments, the layer may be a digital coding on the resource distribution document. In some embodiments, the layer may be a physical printed mark or notification on the resource distribution document. In some embodiments, the layer may be a physically printed necessary part of the resource distribution document. In yet other embodiments, each layer may be a particular color printed ink that combine to generate a final resource distribution document ready for distribution and depositing.

The layer system may communicate the resource distribution document generation to the third user for review and approval. The third user may log into his/her user device and approve the resource distribution document generation. The layering system may receive this approval and confirm the user device geo-location to ensure no misappropriation. The layering system may apply the third user's layer to the resource distribution document, as illustrated in block 508. In some embodiments, the layer may be a digital coding on the resource distribution document. In some embodiments, the layer may be a physical printed mark or notification on the resource distribution document. In some embodiments, the layer may be a physically printed necessary part of the resource distribution document. In yet other embodiments, each layer may be a particular color printed ink that combine to generate a final resource distribution document ready for distribution and depositing.

The layer system may communicate the resource distribution document generation to the fourth user for review and approval. The fourth user may log into his/her user device and approve the resource distribution document generation. The layering system may receive this approval and confirm the user device geo-location to ensure no misappropriation. The layering system may apply the fourth user's layer to the resource distribution document, as illustrated in block 510. In some embodiments, the layer may be a digital coding on the resource distribution document. In some embodiments, the layer may be a physical printed mark or notification on the resource distribution document. In some embodiments, the layer may be a physically printed necessary part of the resource distribution document. In yet other embodiments, each layer may be a particular color printed ink that combine to generate a final resource distribution document ready for distribution and depositing.

In some embodiments, each user may receive a request for approval and application of their layer at the same time. In some embodiments, each user may receive a request for approval and layer addition in an order assigned by the entity. Furthermore in the illustration represented in FIG. 4 there are four users that require approval for generation of the resource distribution document, however one or ordinary skill in the art will appreciate that one or more, or two or more, users may be required for resource distribution document generation and approval.

FIG. 5 illustrates a representation of one embodiment of a resource distribution document 300, in accordance with embodiments of the present invention. The resource distribution document illustrated in FIG. 5 is a check. However, one will appreciate that any financial record, financial document, or the like may be provided as a resource distribution document.

The check 300 may comprise an image of the entire check, a thumbnail version of the image of the check, individual pieces of check information, all or some portion of the front of the check, all or some portion of the back of the check, or the like. Check 300 comprises check information, wherein the check information comprises contact information 305, the payee 310, the memo description 315, the account number and routing number 320 associated with the appropriate customer account, the date 325, the check number 330, the amount of the check 335, the signature 340, or the like. In some embodiments, the check information may comprise text. In other embodiments, the check information may comprise an image.

FIG. 6 illustrates a representation of one embodiment of a resource distribution document 400, in accordance with embodiments of the present invention. Again, the resource distribution document illustrated in FIG. 5 is a check. However, one will appreciate that any financial record, financial document, or the like may be provided.

In the illustrated embodiment, the check corresponds to the entire front portion of a check, but it will be understood that the check may also correspond to individual pieces of check information, portions of a check, or the like. The check, in some embodiments, includes the format of certain types of checks associated with a bank, a merchant, an account holder, types of checks, style of checks, check manufacturer, and so forth. The check comprises check information, wherein the check information includes, for example, a contact information field 405, a payee line field 410, a memo description field 415, an account number and routing number field 420 associated with the appropriate user or customer account, a date line field 425, a check number field 430, an amount box field 435, a signature line field 440, or the like.

FIG. 7 illustrates a process for layering a resource distribution document 600, in accordance with embodiments of the present invention. The process 600 is initiated by assigning one or more users each a layer for generation of a resource distribution document, as illustrated in block 602. In this way, each identified user may be assigned a signal layer to authorize and approve the resource distribution document. Next, as illustrated in block 604, the process 600 continues by integrating into a user device for each of the one or more users, such that those users have the ability to approve the resource distribution document.

Next, as illustrated in block 606, the process 600 continues by identifying a request for a resource distribution document to be generated and trigger communication of the request to one or more users. As such, the layer system may trigger the request for the one or more users to review the resource distribution document for layer application. Furthermore, the system may identify the user device geo-location used for authorization for confirmation of no misappropriation. In some embodiments, all the users may be notified at the same time of a request for resource distribution document generation in a parallel notification. In other embodiments, the may be a serial notification where more junior level users are required to add a layer first, prior to the more senior level users reviewing and applying a layer to the document. In some embodiments, a junior level user may conditionally approve the document based on a senior level user approving the document.

As illustrated in block 608, the process 600 continues by applying, upon the user layer authorization and geo-location confirmation. As such, the layering system may apply a layer to the resource distribution document during generation upon user approval.

Next, as illustrated in block 610, the process 600 continues confirming that the two or more layers applied to the resource distribution document are the complete set of layers required for that particular resource distribution document. In some embodiments, users may have varying degree of authorization. For example, a senior user may be allowed to authorize a layer on a behalf of a more junior user. As such, in some embodiments, the more senior users may approve the layers for the junior users.

If the layers applied are not the complete set of layers for the document, the layering system may, in some embodiments, deny generation or depositing of the resource distribution document based on the complete set of layers for that document not being applied, as illustrated in block 614. If the layers applied are the complete set of layers for the document, the layering system may, in some embodiments, generate the resource distribution document based on the completed set of layers for that document being applied, as illustrated in block 612.

In some embodiments, the invention further comprises receiving a request for depositing the resource distribution document from the end user via a receiving institution; confirming the complete set of two or more layers on the resource distribution document based on the coded indication that the complete set of two or more layers have been authorized by the one or more users; and communicating authorization of deposition of the resource distribution document to the receiving institution.

In some embodiments, the invention further comprises: receiving a request for depositing the resource distribution document from the end user via a receiving institution; identifying a lack of the complete set of two or more layers on the resource distribution document based on the coded indication that the complete set of two or more layers have been authorized by the one or more users; and communicating denial of deposition of the resource distribution document to the receiving institution.

In some embodiments, the invention further comprises: receiving a request from an entity for layering authentication of resource distribution document generation; identifying the one or more users required for resource distribution document authentication within the entity and assign each of the one or more users a user specific layer for generation of a resource distribution document; identifying a geo-location of a user device associated with each of the one or more users required for resource distribution document authentication within the entity; and integrating layering authentication abilities onto the user device associated with each of the one or more users for authorizing and applying the user specific layer from the user device.

In some embodiments, the layer is a digital coding onto a resource distribution document that upon the complete set of two or more layers being coded on the resource distribution document activates the resource distribution document depositing.

In some embodiments, each layer of the complete set of two or more layers being coded on the resource distribution document comprises a physical attribute required for the resource distribution document to be valid, wherein the physical attributes include account numbers, amounts, and signature lines.

In some embodiments, each type of resource distribution document requires a specific set of two or more layers from one or more different users within an entity. In some embodiments, the user is one or more individuals with a user device at an entity responsible for an approval of resource distribution document distribution from the entity.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for layering authentication of a resource distribution document, the system comprising:
   a memory device with computer-readable program code stored thereon;
   a communication device;
   a printing device for printing the resource distribution documents;
   a processing device operatively coupled to the memory device and the communication device, wherein the processing device is configured to execute the computer-readable program code to:
   assign one or more users a layer for generation of a resource distribution document, wherein the one or more users are assigned the layer based on the one or more users required approval for generation of the resource distribution document, wherein each layer is specific to each of the one or more users, and wherein each layer corresponds to a different color printed ink which combine to generate a final resource distribution document;
   integrate a user device for each of the one or more users for layer authorization and application via the user device;
   receive a geo-location for the user device and identify the geo-location of the user device as being a location of the user device that does not deviate from a normal routine of the user device;
   communicate a request for generation of a resource distribution document to a first of the one or more users, wherein the request for generation of the resource distribution document comprises assigning a layer for the first of the one or more users to approve;
   apply, upon user layer authorization, two or more layers to the resource distribution document, wherein each of the two or more layers are specific to one of the one or more users;
   confirm the two or more layers applied to the resource distribution document are a complete set of two or more layers required for the resource distribution document to be generated;
   generate the resource distribution document comprising a coded indication that the complete set of two or more layers have been authorized by the one or more users, wherein each layer of the complete set of two or more layers being coded on the resource distribution document comprises a physical attribute required for the resource distribution document to be valid, wherein the physical attributes include account numbers, amounts, and signature lines; and
   distribute the resource distribution document to an end user for depositing.

2. The system of claim 1, further comprising:
   receiving a request for depositing the resource distribution document from the end user via a receiving institution;
   confirming the complete set of two or more layers on the resource distribution document based on the coded indication that the complete set of two or more layers have been authorized by the one or more users; and
   communicating authorization of deposition of the resource distribution document to the receiving institution.

3. The system of claim 1, further comprising:
   receiving a request for depositing the resource distribution document from the end user via a receiving institution;
   identifying a lack of the complete set of two or more layers on the resource distribution document based on the coded indication that the complete set of two or more layers have been authorized by the one or more users; and communicating denial of deposition of the resource distribution document to the receiving institution.

4. The system of claim 1, further comprising:

receiving a request from an entity for layering authentication of resource distribution document generation;

identifying the one or more users required for resource distribution document authentication within the entity and assign each of the one or more users a user specific layer for generation of a resource distribution document;

identifying a geo-location of a user device associated with each of the one or more users required for resource distribution document authentication within the entity; and integrating layering authentication abilities onto the user device associated with each of the one or more users for authorizing and applying the user specific layer from the user device.

5. The system of claim 1, wherein the layer is a digital coding onto a resource distribution document that upon the complete set of two or more layers being coded on the resource distribution document activates the resource distribution document depositing.

6. The system of claim 1, wherein each type of resource distribution document requires a specific set of two or more layers from one or more different users within an entity.

7. The system of claim 1, wherein the one or more users are one or more individuals with a user device at an entity responsible for an approval of resource distribution document distribution from the entity.

8. A computer program product for layering authentication of a resource distribution document with at least one non-transitory computer-readable medium having computer-readable program code portions embodied therein, the computer-readable program code portions comprising:

assigning one or more users a layer for generation of a resource distribution document, wherein the one or more users are assigned the layer based on the one or more users required approval for generation of the resource distribution document, wherein each layer is specific to each of the one or more users, and wherein each layer corresponds to a different color printed ink which combine to generate a final resource distribution document;

integrating a user device for each of the one or more users for layer authorization and application via the user device;

receive a geo-location for the user device and identify the geo-location of the user device as being a location of the user device that does not deviate from a normal routine of the user device;

communicating a request for generation of a resource distribution document to a first of the one or more users, wherein the request for generation of the resource distribution document comprises assigning a layer for the first of the one or more users to approve;

applying, upon user layer authorization, two or more layers to the resource distribution document, wherein each of the two or more layers are specific to one of the one or more users;

confirming the two or more layers applied to the resource distribution document are a complete set of two or more layers required for the resource distribution document to be generated;

generating the resource distribution document comprising a coded indication that the complete set of two or more layers have been authorized by the one or more users, wherein each layer of the complete set of two or more layers being coded on the resource distribution document comprises a physical attribute required for the resource distribution document to be valid, wherein the physical attributes include account numbers, amounts, and signature lines; and distributing the resource distribution document to an end user for depositing.

9. The computer program product of claim 8, further comprising:

receiving a request for depositing the resource distribution document from the end user via a receiving institution;

confirming the complete set of two or more layers on the resource distribution document based on the coded indication that the complete set of two or more layers have been authorized by the one or more users; and communicating authorization of deposition of the resource distribution document to the receiving institution.

10. The computer program product of claim 8, further comprising:

receiving a request for depositing the resource distribution document from the end user via a receiving institution;

identifying a lack of the complete set of two or more layers on the resource distribution document based on the coded indication that the complete set of two or more layers have been authorized by the one or more users; and communicating denial of deposition of the resource distribution document to the receiving institution.

11. The computer program product of claim 8, further comprising:

receiving a request from an entity for layering authentication of resource distribution document generation;

identifying the one or more users required for resource distribution document authentication within the entity and assign each of the one or more users a user specific layer for generation of a resource distribution document;

identifying a geo-location of a user device associated with each of the one or more users required for resource distribution document authentication within the entity; and integrating layering authentication abilities onto the user device associated with each of the one or more users for authorizing and applying the user specific layer from the user device.

12. The computer program product of claim 8, wherein the layer is a digital coding onto a resource distribution document that upon the complete set of two or more layers being coded on the resource distribution document activates the resource distribution document depositing.

13. The computer program product of claim 8, wherein each type of resource distribution document requires a specific set of two or more layers from one or more different users within an entity.

14. The computer program product of claim 8, wherein the one or more users are one or more individuals with a user device at an entity responsible for an approval of resource distribution document distribution from the entity.

15. A computer-implemented method for layering authentication of a resource distribution document, the method comprising:

providing a computing system comprising a computer processing device and a non-transitory computer readable medium, where the non-transitory computer readable medium comprises configured computer program instruction code, such that when said instruction code is operated by said computer processing device, said computer processing device performs the following operations:

assigning one or more users a layer for generation of a resource distribution document, wherein the one or more users are assigned the layer based on the one or more users required approval for generation of the resource distribution document, wherein each layer is specific to each of the one or more users, and wherein each layer corresponds to a different color printed ink which combine to generate a final resource distribution document;

integrating a user device for each of the one or more users for layer authorization and application via the user device;

receiving a geo-location for the user device and identifying the geo-location of the user device as being a location of the user device that does not deviate from a normal routine of the user device;

communicating a request for generation of a resource distribution document to a first of the one or more users, wherein the request for generation of the resource distribution document comprises assigning a layer for the first of the one or more users to approve by communicating the request based on a geo location of the user device;

applying, upon user layer authorization, two or more layers to the resource distribution document, wherein each of the two or more layers are specific to one of the one or more users;

confirming the two or more layers applied to the resource distribution document are a complete set of two or more layers required for the resource distribution document to be generated;

generating the resource distribution document comprising a coded indication that the complete set of two or more layers have been authorized by the one or more users, wherein each layer of the complete set of two or more layers being coded on the resource distribution document comprises a physical attribute required for the resource distribution document to be valid, wherein the physical attributes include account numbers, amounts, and signature lines; and distributing the resource distribution document to an end user for depositing.

16. The computer-implemented method of claim 15, further comprising:

receiving a request for depositing the resource distribution document from the end user via a receiving institution;

confirming the complete set of two or more layers on the resource distribution document based on the coded indication that the complete set of two or more layers have been authorized by the one or more users; and communicating authorization of deposition of the resource distribution document to the receiving institution.

17. The computer-implemented method of claim 15, further comprising:

receiving a request for depositing the resource distribution document from the end user via a receiving institution;

identifying a lack of the complete set of two or more layers on the resource distribution document based on the coded indication that the complete set of two or more layers have been authorized by the one or more users; and communicating denial of deposition of the resource distribution document to the receiving institution.

18. The computer-implemented method of claim 15, wherein the layer is a digital coding onto a resource distribution document that upon the complete set of two or more layers being coded on the resource distribution document activates the resource distribution document depositing.

* * * * *